US009878957B2

(12) United States Patent
Reyes et al.

(10) Patent No.: US 9,878,957 B2
(45) Date of Patent: Jan. 30, 2018

(54) CATALYST MATERIAL EXTRACTION FROM POLYCRYSTALLINE DIAMOND TABLES

(71) Applicant: Halliburton Energy Services, Inc., Houston, TX (US)

(72) Inventors: Enrique Antonio Reyes, Tomball, TX (US); Tiffany Anne Pinder, Houston, TX (US); Qi Liang, Richmond, VA (US); Gagan Saini, Conroe, TX (US); Brian Atkins, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 13 days.

(21) Appl. No.: 15/107,004

(22) PCT Filed: Jun. 30, 2015

(86) PCT No.: PCT/US2015/038485
§ 371 (c)(1),
(2) Date: Jun. 21, 2016

(87) PCT Pub. No.: WO2017/003444
PCT Pub. Date: Jan. 5, 2017

(65) Prior Publication Data
US 2017/0204013 A1 Jul. 20, 2017

(51) Int. Cl.
*B23K 31/02* (2006.01)
*C04B 35/528* (2006.01)
(Continued)

(52) U.S. Cl.
CPC .......... *C04B 35/528* (2013.01); *B23K 1/0008* (2013.01); *C04B 35/6303* (2013.01);
(Continued)

(58) Field of Classification Search
CPC ... C04B 35/528; C04B 35/64; C04B 35/6303; C04B 35/638; C04B 2235/427;
(Continued)

(56) References Cited

U.S. PATENT DOCUMENTS 3,969,489 A 7/1976 Wu
6,344,149 B1 2/2002 Oles
(Continued)

FOREIGN PATENT DOCUMENTS

| GB | 2524401 A | * | 9/2015 | ............... B01J 3/062 |
| SU | 688430 A | * | 9/1979 | |
| WO | WO 2007042920 A1 | * | 4/2007 | ............... B24D 3/10 |

OTHER PUBLICATIONS

ISR/WO for PCT/US2015/038485 dated Mar. 8, 2016.

*Primary Examiner* — Kiley Stoner
(74) *Attorney, Agent, or Firm* — McDermott Will & Emery LLP

(57) ABSTRACT

Catalyst extraction from polycrystalline diamond table may be achieved by treating with a halogen (in the gas phase or dissolved in a nonpolar organic solvent) to convert the catalyzing material to a salt. Then, polar organic solvents may optionally be used to leach the salt from the polycrystalline diamond table. The polycrystalline diamond (with the salt of the catalyzing material present or at least partially leached therefrom) may be brazed to a hard composite substrate to produce a cutter suitable for use in a matrix drill bit.

17 Claims, 6 Drawing Sheets

(51) Int. Cl.

| | | |
|---|---|---|
| *B23K 1/00* | (2006.01) | |
| *C22C 26/00* | (2006.01) | |
| *C04B 35/64* | (2006.01) | |
| *C04B 35/63* | (2006.01) | |
| *C04B 35/638* | (2006.01) | |
| *E21B 10/567* | (2006.01) | |
| *B23K 101/00* | (2006.01) | |
| *B23K 103/00* | (2006.01) | |
| *E21B 10/54* | (2006.01) | |
| *E21B 10/60* | (2006.01) | |

(52) U.S. Cl.
CPC ............ *C04B 35/638* (2013.01); *C04B 35/64* (2013.01); *C22C 26/00* (2013.01); *E21B 10/567* (2013.01); *B23K 2201/002* (2013.01); *B23K 2203/50* (2015.10); *C04B 2235/405* (2013.01); *C04B 2235/427* (2013.01); *E21B 10/54* (2013.01); *E21B 10/602* (2013.01)

(58) Field of Classification Search
CPC ............ C04B 2235/405; B23K 1/0008; B23K 2201/002; B23K 2203/50; B23K 1/00–1/206; C22C 26/00; E21B 10/567; E21B 10/54; E21B 10/602
USPC ...... 228/121–124.7, 203, 205–206, 245–262
See application file for complete search history.

(56) References Cited

U.S. PATENT DOCUMENTS

| | | | |
|---|---|---|---|
| 6,861,137 | B2 | 3/2005 | Griffin et al. |
| 7,909,900 | B2 | 3/2011 | Ras |
| 8,383,200 | B2 * | 2/2013 | Xiao .................... C23C 16/0272 427/248.1 |
| 8,404,019 | B2 | 3/2013 | Ladi et al. |
| 8,435,324 | B2 | 5/2013 | Ladi et al. |
| 8,864,858 | B1 | 10/2014 | Kidd et al. |
| 2009/0139150 | A1 * | 6/2009 | Ras .......................... B24D 3/10 51/309 |
| 2009/0178345 | A1 * | 7/2009 | Russell .................... B01J 3/062 51/307 |
| 2010/0084196 | A1 | 4/2010 | Bertagnolli et al. |
| 2010/0095602 | A1 * | 4/2010 | Belnap .................... C04B 35/52 51/309 |
| 2010/0212971 | A1 | 8/2010 | Mukhopadhyay et al. |
| 2012/0012401 | A1 | 1/2012 | Gonzalez et al. |
| 2012/0055717 | A1 * | 3/2012 | Liversage ............... E21B 10/56 175/428 |
| 2012/0061149 | A1 * | 3/2012 | Liversage ................ B22F 7/06 175/428 |
| 2012/0234609 | A1 | 9/2012 | Cooley et al. |
| 2013/0001100 | A1 * | 1/2013 | Thigpen .................... C25F 7/00 205/766 |
| 2013/0068540 | A1 | 3/2013 | DiGiovanni |
| 2013/0228383 | A1 | 9/2013 | Mukhopadhyay et al. |
| 2013/0291443 | A1 | 11/2013 | Naidoo et al. |
| 2013/0291447 | A1 | 11/2013 | Mazyar |
| 2014/0060937 | A1 | 3/2014 | Konovalov et al. |
| 2014/0123565 | A1 | 5/2014 | Zhan et al. |

* cited by examiner

CATALYST MATERIAL EXTRACTION FROM POLYCRYSTALLINE DIAMOND TABLES

BACKGROUND

The present application relates to the extraction of catalyzing material from polycrystalline diamond tables.

Drill bits and components thereof are often subjected to extreme conditions (e.g., high temperatures, high pressures, and contact with abrasive surfaces) during subterranean formation drilling or mining operations. Polycrystalline diamond table is often used at the contact points between the drill bit and the formation because of their wear resistance, hardness, and ability to conduct heat away from the point of contact with the formation.

Polycrystalline diamond table is formed by mixing diamond particles and a catalyzing material (alternately referred to in the art as a catalyst) (e.g., cobalt, nickel, iron, Group VIII elements, and alloys thereof) followed by high-pressure, high-temperature (HPHT) sintering. The catalyzing material facilitates bonding between the diamond particles into a larger, polycrystalline diamond table. Once formed, the catalyzing material remains within the body of the polycrystalline diamond table.

The catalyzing material in the polycrystalline diamond table can cause degradation of the polycrystalline diamond table when the catalyzing material is again heated in the absence of an inert atmosphere, for example, during brazing to attach the polycrystalline diamond table to a hard composite substrate when forming a cutter, during brazing to attach the cutter to a drill bit, and during a drilling operation. Specifically, the catalyzing material can cause cracks due to a higher coefficient of thermal expansion compared to diamond and also cause graphitization at diamond grain boundaries. The fractures and graphitization weaken the polycrystalline diamond table and may lead to a reduced lifetime for the drill bit.

To mitigate fracturing of the polycrystalline diamond table, it is common to remove at least some of the catalyzing material, and preferably most of the catalyzing material, from the interstitial spaces of the polycrystalline diamond table before exposing the polycrystalline diamond table to elevated temperatures. Polycrystalline diamond table having a substantial amount of the catalyzing material removed is referred to as thermally stable polycrystalline ("TSP") diamonds. The quality and thermal stability of the polycrystalline diamond table generally increases with greater removal of the catalyzing material.

Catalyzing material is typically removed by leaching, which commonly includes exposing the diamond to strong acids at elevated temperatures that dissolve the catalyzing material. However, this process can be inefficient, often taking days to remove a substantial amount of the catalyzing material.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to the extraction of catalyzing material from polycrystalline diamond tables, specifically, by treating with a halogen (in the gas phase or dissolved in a nonpolar organic solvent) to convert the catalyzing material to a salt. Then, polar organic solvents may optionally be used to leach the salt from the polycrystalline diamond table. Such methods circumvent the conventional leaching methods involving the use of strong acids at elevated temperatures.

Generally, in a strong acid treatment, the acid penetrates into the interstitial space of the polycrystalline diamond table, contacts the catalyst, and dissolves a portion of the catalyzing material by forming a water-soluble salt. The dissolved salt, then, traverses the interstitial spaces to be removed from the polycrystalline diamond table. This process is thermodynamically driven such that the concentration of the dissolved salt at or near the catalyzing material should be low to allow for further reaction and dissolution of the catalyzing material by the acid. Therefore, a significant rate-limiting step is the ability for the acid to traverse the interstitial spaces both into and out of the polycrystalline diamond table. By contrast, the present disclosure includes methods involving the use of a halogen, typically at ambient or near-ambient conditions, to react the halogen with the catalyzing material to form a salt, which may be referred to herein as a "catalyst salt." The foregoing reaction step may be referred to herein as the "halogen/catalyst reaction." For the halogen/catalyst reaction, the halogen may either be in the gas phase or dissolved in a nonpolar organic solvent.

Figure 1:
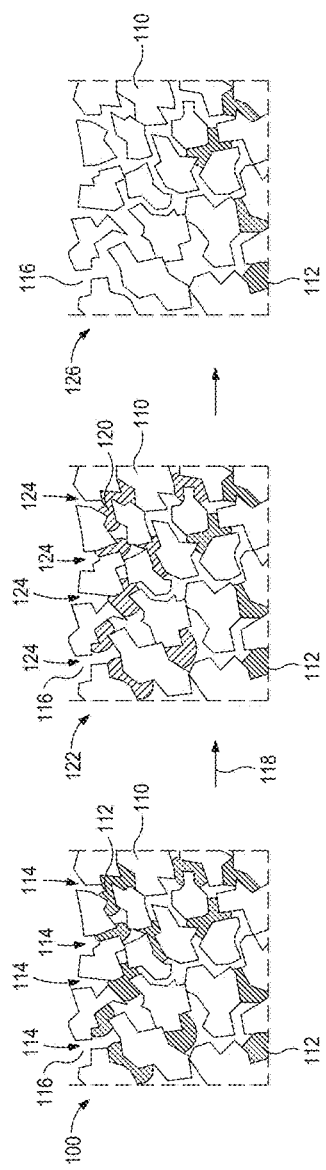
FIG. 1 illustrates treatment of a polycrystalline diamond table with a halogen and a polar organic solvent according to at least some embodiments of the present disclosure.

FIG. 1 illustrates treatment of a polycrystalline diamond table 100 with a halogen 114 and a polar organic solvent 124 according to at least some embodiments of the present disclosure. The polycrystalline diamond table 100 includes fused polycrystalline diamond particles 110 and a catalyzing material 112. During treatment, the halogen 114 (either as a gas or dissolved in a nonpolar organic solvent) traverses the interstitial spaces 116 of the polycrystalline diamond table 100 (alternatively referred to as the interstitial spaces 116 between the polycrystalline diamond particles 110) to reach the catalyzing material 112. The catalyzing material 112 exposed to the halogen 114 then undergoes the halogen/catalyst reaction 118 to produce a catalyst salt 120. As a result, a polycrystalline diamond table 122 is produced having the catalyst salt 120 in the interstitial spaces 116 between the polycrystalline diamond particles 110.

The halogen 114 may be either in the gas phase or dissolved in a nonpolar organic solvent.

In some instances, the use of a gas may be preferred over a liquid because the gas facilitates greater penetration at an increased rate into the polycrystalline diamond table 100. Additionally, the activation energy to convert the catalyzing material 112 to the catalyst salt 120 with the halogen 114 is less than the activation energy for strong acids to react with and dissolve the catalyzing material 112. Accordingly, the halogen/catalyst reaction 118 may provide for a more effective and efficient treatment of the catalyzing material 112 as compared to traditional acid methods.

Without being limited by theory, it is believed that the catalyst salt 120 may have a coefficient to thermal expansion closer to that of diamond as compared to the catalyzing material 112 and be less reactive than the catalyzing material 112 for graphitizing the polycrystalline diamond particles 110 when exposed to high temperatures. Accordingly, in some instances, a polycrystalline diamond table 122 having the catalyst salt 120 in the interstitial spaces 116 between the polycrystalline diamond particles 110 may be used in conjunction with drill bits.

Halogens 114 suitable for use in the methods described herein may include fluorine, bromine, chlorine, iodine, and any combination thereof. When implemented in the gas phase, the halogens 114 may optionally be included with an inert gas (e.g., nitrogen, helium, argon, neon, xenon, and the like, and any combination thereof). The inert gas may be used as a carrier gas and/or to dilute the halogen gas to achieve a desired partial pressure of the halogen gas. When using a halogen gas, the halogen gas may be at a partial pressure such that 10% to 100% of a total gas phase by mole is the halogen gas (e.g., 10% to 99% when diluted with an inert gas).

Based in the catalyzing material 112 and halogen 114 compositions, the catalyst salt 120 may include cobalt fluoride, cobalt chloride, cobalt bromide, cobalt iodide, nickel fluoride, nickel chloride, nickel bromide, nickel iodide, iron fluoride, iron chloride, iron bromide, iron iodide, or a combination thereof.

Nonpolar organic solvents suitable for use in dissolving the halogen 114 may include, but are not limited to, pentane, hexane, benzene, chloroform, diethyl ether, and the like. When using a halogen dissolved in a nonpolar organic solvent, the halogen may be at a concentration of 0.1 g halogen 114 per 100 mL of the nonpolar organic solvent to the solubility limit of the halogen 114 in the nonpolar solvent at the temperature and pressure the halogen/catalyst reaction is performed.

In the methods described herein, the halogen 114 and nonpolar organic solvent, when implemented, do not act as a leaching agent and therefore do not extract the catalyzing material 112 or catalyst salt 120 from the polycrystalline diamond table 122. For example, when the halogen/catalyst reaction 118 is performed with a halogen gas, the catalyzing material 112 and catalyst salt 120 do not become gaseous and therefore are not removed from the polycrystalline diamond table 122 during the halogen/catalyst reaction 118. Rather, the halogen/catalyst reaction 118 may be performed with a halogen gas at a temperature and a pressure (1) sufficient to react the catalyzing material 112 and the halogen 114 but (2) insufficient to cause the catalyst salt 120 to incorporate into the gas phase. By performing the halogen/catalyst reaction 118 under conditions such that the catalyst salt 120 does not leach from the interstitial spaces 116 as a gas, the reaction can be performed at ambient or near-ambient conditions. For example, bromine is a fuming red-brown liquid at room temperature and pressure. At ambient pressure, temperatures of 50° C. to 250° C. allow for reaction between bromine and cobalt to form cobalt bromide while not causing the cobalt bromide to become gaseous.

Similarly, the catalyst 122 and catalyst salt 120 have limited to no solubility in the nonpolar organic solvent (i.e., at a concentration less than 0.1 g catalyst 122 or catalyst salt 120 per 100 mL nonpolar organic solvent 124) so that the catalyst 122 and catalyst salt 120 do not dissolve into the nonpolar organic solvent during the halogen/catalyst reaction 118. Therefore, the halogen/catalyst reaction 118 may be performed with a halogen dispersed in a nonpolar organic solvent at a temperature and a pressure (1) sufficient to react the catalyzing material 112 and the halogen 114 but (2) insufficient to cause the catalyst salt 120 to disperse into the nonpolar organic solvent.

The halogen/catalyst reaction 118 may be performed at a temperature of 0° C. to 300° C., including any subset therebetween. In some instances, where the halogen/catalyst reaction 118 is performed with bromine, the temperature of the reaction 118 may be 20° C. to 100° C., or more preferably 30° C. to 60° C.

The halogen/catalyst reaction 118 may be performed at a pressure of ambient pressure to up to 4 MPa, including any subset therebetween.

Systems for performing the halogen/catalyst reaction 118 should preferably be formed of materials that are nonreactive or have limited reactivity with halogens 114. Examples of such materials include, but are not limited to, quartz, titanium alloys, HASTELLOY C® (a nickel-molybdenum-chromium wrought alloy, available from Haynes Internactional, Inc.), MONEL® (a nickel-copper alloy, available from Special Metals Corporation), INCONEL (a nickel-chromium alloy, available from Special Metals Corporation), and the like.

Referring again to FIG. 1, after conversion to the catalyst salt 120 in the methods described herein, a polar organic solvent 124 may optionally be used to dissolve and remove the catalyst salt 120 from the polycrystalline diamond table 122. The resultant polycrystalline diamond table 126 may be substantially free of the catalyst salt 120 (e.g., contain less than 1% by weight of the polycrystalline diamond table 126).

Advantageously, polar organic solvents 124 wet diamond better than the water-based acids. Therefore, the catalyst salt 120 may be effectively and efficiently removed from the interstitial spaces 116 of the polycrystalline diamond table 122 using polar organic solvents 124.

Polar organic solvents 124 suitable for use in the methods described herein may include polar organic fluids in which the catalyst salt 120 is soluble (i.e., at a concentration greater than 0.1 g catalyst salt 120 per 100 mL polar organic solvent 124). For example, acetone, among other solvents, may be used when cobalt bromide salts are formed by bromine treatment of a polycrystalline diamond table 100 formed with a cobalt catalyst. Examples of polar organic solvents 124 may include, but are not limited to, acetone, alcohols (e.g., methanol, ethanol, butanol, isopropanol, n-propanol, and the like), ethyl acetate, dimethylformamide, acetonitrile, dimethyl sulfoxide, and the like, and any combination thereof.

The polycrystalline diamond table 122 with catalyst salt 120 therein may be treated with the polar organic solvent 124 in any suitable manner. For example, the polycrystalline diamond table 122 with catalyst salt 120 therein may, in some instances, be soaked or washed with the polar organic solvent 124.

In some instances, the polycrystalline diamond table 122 with catalyst salt 120 therein may be sprayed with the polar organic solvent 124. The spray may be a low-velocity spray like a mist to a high-velocity spray like a jet, where the angle of impingement on the polycrystalline diamond table 122 may be between 5° and perpendicular relative to the surface of the polycrystalline diamond table 122.

In some instances, removal of the catalyst salt 120 may be facilitated by increasing the temperature of the polar organic solvent 124 (e.g., via a microwave), agitating the polar organic solvent 124 (e.g., via sonication), and the like.

The polycrystalline diamond table 122,126 described herein (e.g., treated with the halogen 114 and optionally the polar organic solvent 124) may be used in a drill bit.

Figure 2:
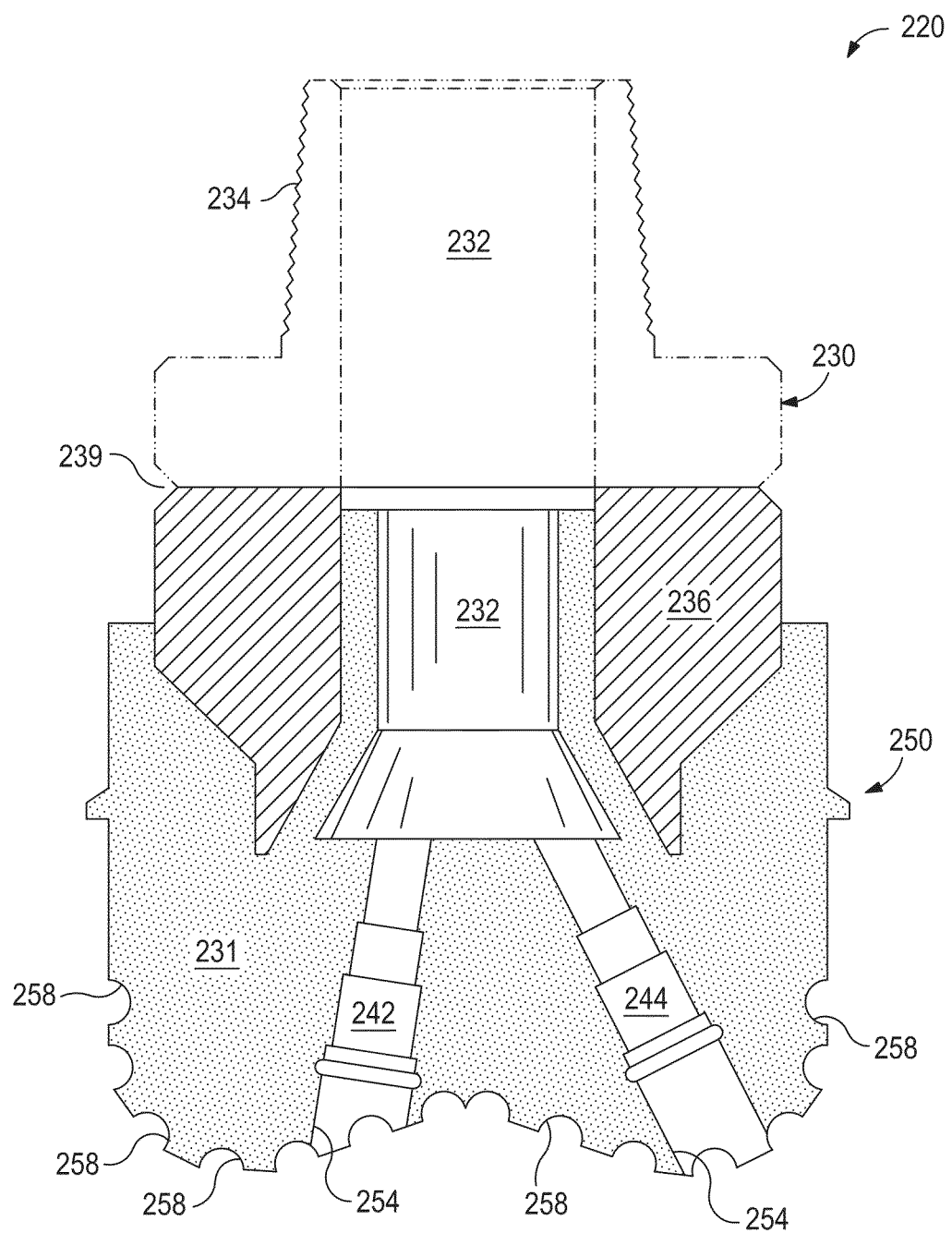
FIG. 2 is a cross-sectional view of a matrix drill bit having a matrix bit body formed of a hard composite material.

FIG. 2 is a cross-sectional view of a matrix drill bit 220 having a matrix bit body 250 formed of a hard composite material 231. An exemplary hard composite material may include, but not be limited to, reinforcing particles dispersed in a binder material. As used herein, the term "matrix drill bit" encompasses rotary drag bits, drag bits, fixed cutter drill bits, and any other drill bit having a matrix bit body and capable of incorporating the teachings of the present disclosure.

For embodiments such as those shown in FIG. 2, the matrix drill bit 220 may include a metal shank 230 with a metal blank 236 securely attached thereto (e.g., at weld location 239). The metal blank 236 extends into matrix bit body 250. The metal shank 230 includes a threaded connection 234 distal to the metal blank 236.

The metal shank 230 and metal blank 236 are generally cylindrical structures that at least partially define corresponding fluid cavities 232 that fluidly communicate with each other. The fluid cavity 232 of the metal blank 236 may further extend longitudinally into the matrix bit body 250. At least one flow passageway (shown as two flow passageways 242 and 244) may extend from the fluid cavity 32 to exterior portions of the matrix bit body 250. Nozzle openings 254 may be defined at the ends of the flow passageways 242 and 244 at the exterior portions of the matrix bit body 250.

A plurality of indentations or pockets 258 are formed in the matrix bit body 250 and are shaped or otherwise configured to receive cutters.

Figure 3:
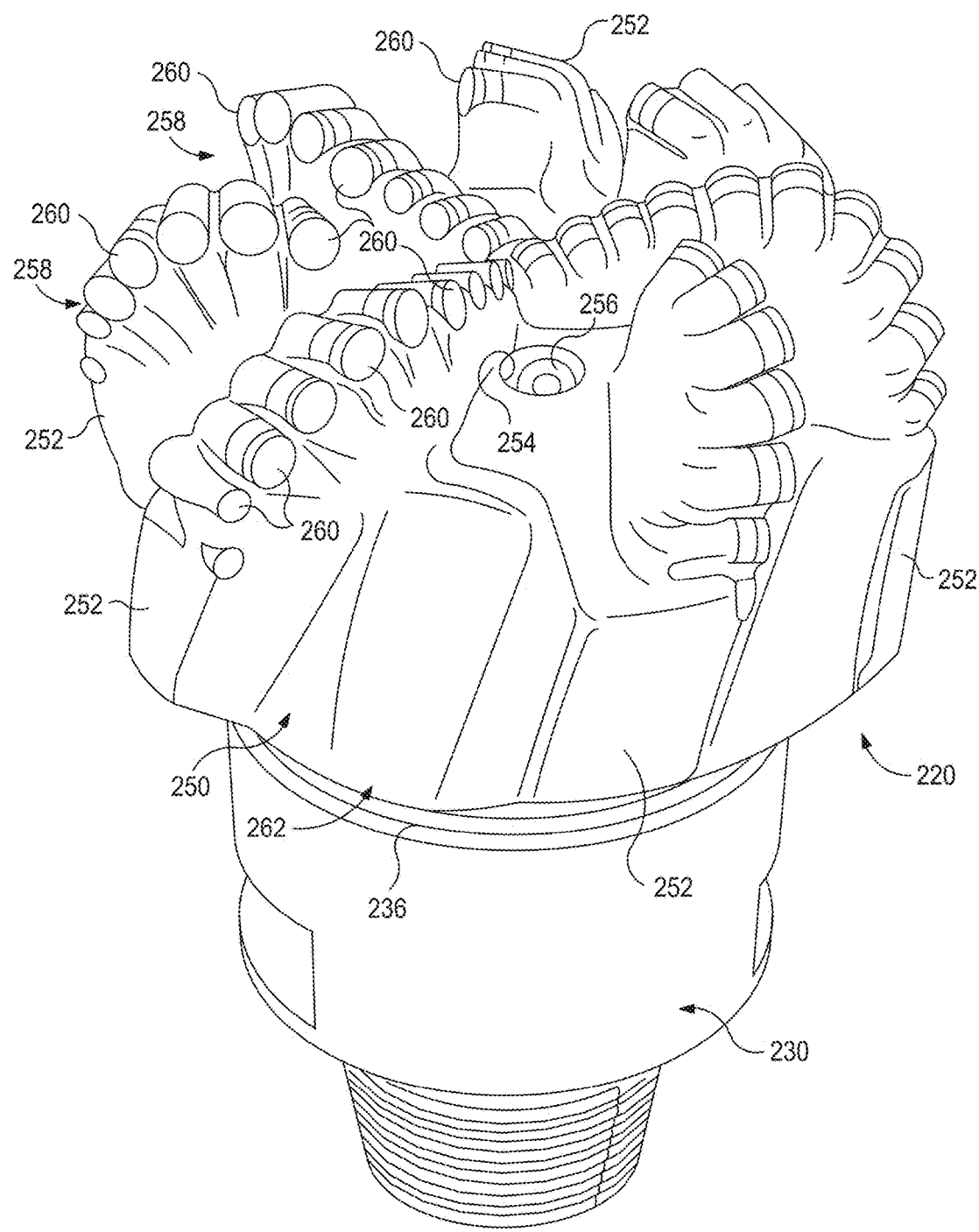
FIG. 3 is an isometric view of the matrix drill bit that includes polycrystalline diamond cutters according to at least some embodiments of the present disclosure.

FIG. 3 is an isometric view of the matrix drill bit that includes a plurality of cutters 260 according to at least some embodiments of the present disclosure. As illustrated, the matrix drill bit 220 includes the metal blank 236 and the metal shank 230, as generally described above with reference to FIG. 2.

The matrix bit body 250 includes a plurality of cutter blades 252 formed on the exterior of the matrix bit body 250. Cutter blades 252 may be spaced from each other on the exterior of the matrix bit body 250 to form fluid flow paths or junk slots 262 therebetween.

As illustrated, the plurality of pockets 258 may be formed in the cutter blades 252 at selected locations. A cutter 260 may be securely mounted (e.g., via brazing) in each pocket 258 to engage and remove portions of a subterranean formation during drilling operations. More particularly, each cutter 260 may scrape and gouge formation materials from the bottom and sides of a wellbore during rotation of the matrix drill bit 220 by an attached drill string.

A nozzle 256 may be disposed in each nozzle opening 254. For some applications, nozzles 256 may be described or otherwise characterized as "interchangeable" nozzles.

Figure 4:
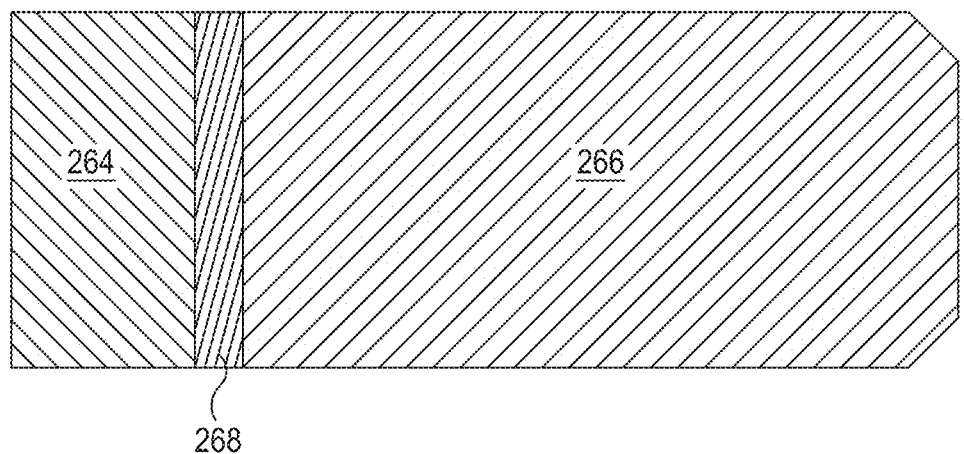
FIG. 4 is a cross-sectional view of a polycrystalline diamond cutter according to at least some embodiments of the present disclosure.

FIG. 4 is a cross-sectional view of an exemplary cutter 260 according to at least some embodiments of the present disclosure. The cutter 260 is formed of a polycrystalline diamond table 264 (e.g., polycrystalline diamond table 122 or 126 of FIG. 1) bonded to a hard composite substrate 266 (e.g., tungsten carbide reinforcing particles dispersed in a copper or cobalt continuous binder phase) with a braze material 268.

Figure 5:
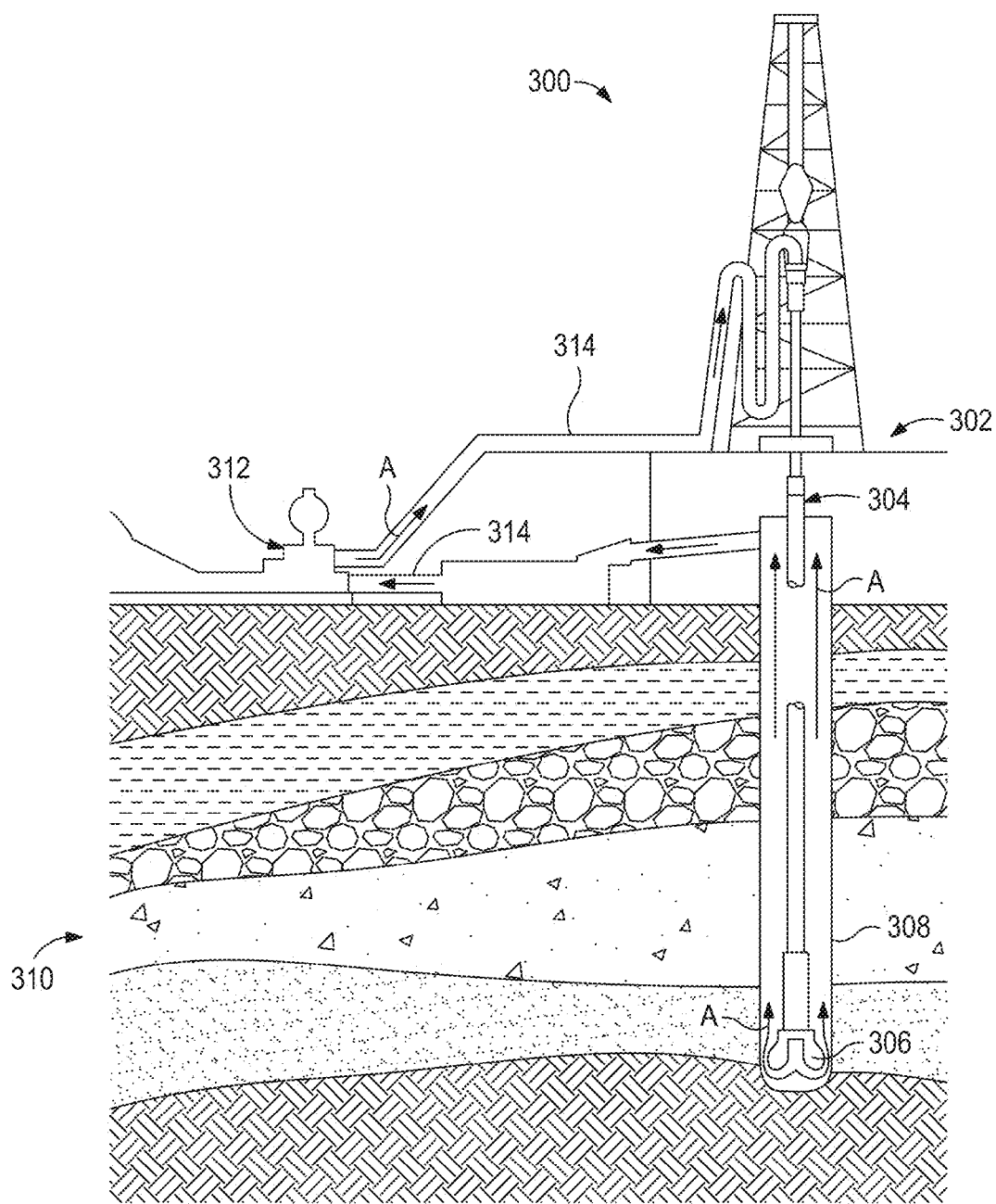
FIG. 5 is a schematic drawing showing one example of a drilling assembly suitable for use in conjunction with the matrix drill bits that include polycrystalline diamond cutters of the present disclosure.

FIG. 5 is a schematic showing one example of a drilling assembly 300 suitable for use in conjunction with matrix drill bits that include the cutters of the present disclosure (e.g., cutter 260 of FIGS. 3-4). It should be noted that while FIG. 5 generally depicts a land-based drilling assembly, those skilled in the art will readily recognize that the principles described herein are equally applicable to subsea drilling operations that employ floating or sea-based platforms and rigs, without departing from the scope of the disclosure.

The drilling assembly 300 includes a drilling platform 302 coupled to a drill string 304. The drill string 304 may include, but is not limited to, drill pipe and coiled tubing, as generally known to those skilled in the art apart from the particular teachings of this disclosure. A matrix drill bit 306 according to the embodiments described herein is attached to the distal end of the drill string 304 and is driven either by a downhole motor and/or via rotation of the drill string 304 from the well surface. As the drill bit 306 rotates, it creates a wellbore 308 that penetrates the subterranean formation 310. The drilling assembly 300 also includes a pump 312 that circulates a drilling fluid through the drill string (as illustrated as flow arrows A) and other pipes 314.

One skilled in the art would recognize the other equipment suitable for use in conjunction with drilling assembly 300, which may include, but is not limited to, retention pits, mixers, shakers (e.g., shale shaker), centrifuges, hydrocyclones, separators (including magnetic and electrical separators), desilters, desanders, filters (e.g., diatomaceous earth filters), heat exchangers, and any fluid reclamation equipment. Further, the drilling assembly may include one or more sensors, gauges, pumps, compressors, and the like.

Embodiments disclosed herein include Embodiment A, Embodiment B, Embodiment C, and Embodiment D.

Embodiment A: A method involving exposing a catalyzing material disposed in interstitial spaces of a polycrystalline diamond table to a halogen gas to produce a catalyst salt in the interstitial spaces of the polycrystalline diamond table, wherein reacting is at a temperature and a pressure (1) sufficient to react the catalyst material and the halogen gas but (2) insufficient to cause the catalyst salt to incorporate into a gas phase.

Embodiment A may have one or more of the following additional elements in any combination: Element 1: the method further involving brazing the polycrystalline diamond table having the catalyst salt therein to a hard composite substrate; Element 2: the method further involving treating the polycrystalline diamond table having the catalyst salt therein with a polar organic solvent, thereby removing at least some of the catalyst salt from the interstitial spaces of a polycrystalline diamond table; Element 3: the method further involving Element 2 and brazing the polycrystalline diamond table having at least some of the catalyst salt removed to a hard composite substrate; Element 4: wherein the halogen gas is bromine, the catalyzing material is cobalt, the temperature is 20° C. to 100° C., and the pressure is 0.1 MPa to 4 MPa; Element 5: wherein the temperature is 0° C. to 300° C.; Element 6: wherein the pressure is ambient pressure to 4 MPa; Element 7: wherein the catalyst salt comprises at least one of: cobalt fluoride, cobalt chloride, cobalt bromide, cobalt iodide, nickel fluoride, nickel chloride, nickel bromide, nickel iodide, iron fluoride, iron chloride, iron bromide, or iron iodide; Element 8: the method further comprising diluting the halogen gas in an inert gas; and Element 9: Element 8 and wherein the halogen gas is present at 10% to 99% of a total gas phase by mole.

By way of non-limiting example, exemplary combinations applicable to Embodiment A include: Element 5 in combination with Element 6; Element 7 in combination with one or more of Elements 5-6; Element 7 in combination with Element 8 and optionally Element 9; Element 5 in combination with Element 8 and optionally Element 9; Element 6 in combination with Element 8 and optionally Element 9; Element 4 in combination with Element 8 and optionally Element 9; Elements 5-6 in combination with Element 8 and optionally Element 9; Element 1 in combination with one or more of Elements 4-9 including the foregoing combinations; and Element 2 optionally with Element 3 in combination with one or more of Elements 4-9 including the foregoing combinations.

Embodiment B: A method involving exposing a catalyzing material disposed in interstitial spaces of a polycrystalline diamond table to a halogen dissolved in a nonpolar organic solvent to produce a catalyst salt in the interstitial spaces of the polycrystalline diamond table, wherein the catalyst salt has a solubility of less than 0.1 g/100 mL in the nonpolar organic solvent. Embodiment B may have one or more of the following additional elements in any combination: Element 10: the method further involving brazing the polycrystalline diamond table having the catalyst salt therein to a hard composite substrate; Element 11: the method further involving treating the polycrystalline diamond table having the catalyst salt therein with a polar organic solvent, thereby removing at least some of the catalyst salt from the interstitial spaces of a polycrystalline diamond table; Element 12: the method further involving Element 6 and brazing the polycrystalline diamond table having at least some of the catalyst salt removed to a hard composite substrate; Element 13: wherein exposing the catalyzing material to the halogen dissolved in the nonpolar organic solvent is at a temperature of 0° C. to 300° C.; Element 14: wherein exposing the catalyzing material to the halogen dissolved in the nonpolar organic solvent is at a pressure of ambient pressure to 4 MPa; and Element 15: wherein the catalyst salt comprises at least one of: cobalt fluoride, cobalt chloride, cobalt bromide, cobalt iodide, nickel fluoride, nickel chloride, nickel bromide, nickel iodide, iron fluoride, iron chloride, iron bromide, or iron iodide.

By way of non-limiting example, exemplary combinations applicable to Embodiment B include: Element 13 in combination with Element 14; Element 13 in combination with Element 15; Element 14 in combination with Element 15; Elements 13-15 in combination; Element 10 in combination with one or more of Elements 13-15 including the foregoing combinations; and Element 11 optionally with Element 12 in combination with one or more of Elements 13-15 including the foregoing combinations.

Embodiment C: A cutter including a polycrystalline diamond comprising fused polycrystalline diamond particles and a catalyst salt disposed in interstitial spaces between the fused polycrystalline diamond particles; and a hard composite substrate and bound to the polycrystalline diamond table with a braze material.

Embodiment D: A drilling assembly including a drill string extending into a wellbore; a pump fluidly connected to the drill string and configured to circulate a drilling fluid into the drill string and through the wellbore; and a drill bit attached to an end of the drill string, the drill bit having a matrix bit body and a plurality of cutters according to Embodiment B coupled to an exterior portion of the matrix bit body.

Embodiments C and D may further include Element 8: wherein the catalyst salt comprises at least one of: cobalt fluoride, cobalt chloride, cobalt bromide, cobalt iodide, nickel fluoride, nickel chloride, nickel bromide, nickel iodide, iron fluoride, iron chloride, iron bromide, or iron iodide.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1

1 gram of cobalt powder was placed in either a HASTELLOY C® container with 0.5 mL of liquid bromine. The container was then pressurized to 1.4 MPa. In two separate experiments, the temperature was held at either 180° C. or 200° C. for 90 minutes. After the allotted time, acetone was added to the container yielding a green solution, which indicates that cobalt bromide was formed.

Example 2

A mixture of 5% by weight cobalt powder and polycrystalline diamond powder were mixed. The powder mixture was placed in the HASTELLOY C® container with 5 mL of liquid bromine. The container was then pressurized to 1.4 MPa and held at 50° C. for 4 hours. After the reaction, acetone was added to the container yielding a green solution, which indicates that cobalt bromide was formed.

Example 3

A polycrystalline diamond table formed with a cobalt catalyzing material was exposed to gaseous bromine for 90 minutes at 25° C. and 0.1 MPa. After the bromine gas treatment, the polycrystalline diamond table was washed with 100 mL acetone for 10 minutes at 25° C. three times.

Figure 6:
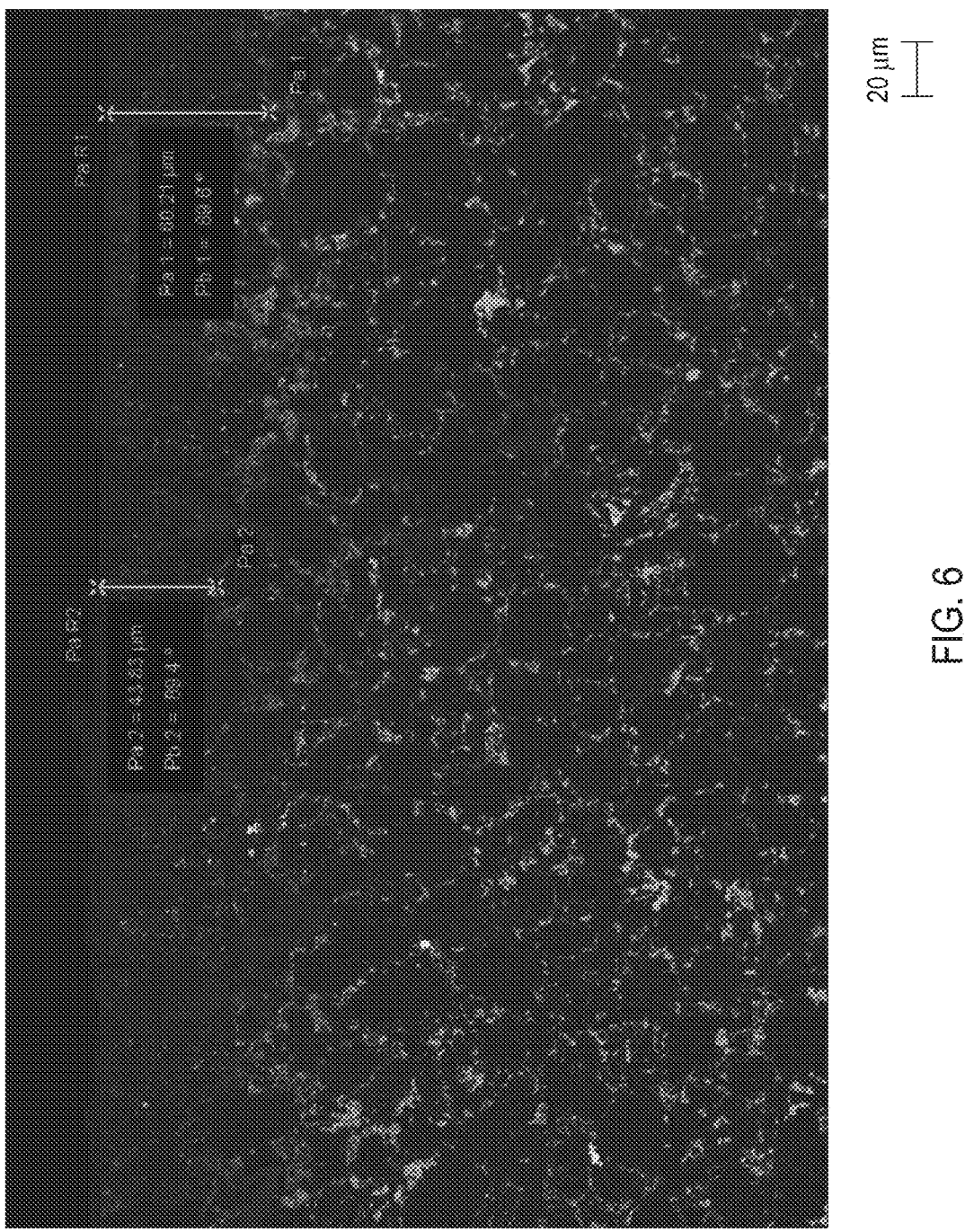
FIG. 6 is a cross-section of the polycrystalline diamond table after reaction with the bromine gas and washing with a polar organic solvent.

The resultant polycrystalline diamond table was analyzed via scanning electron microscope for the residual cobalt. FIG. 6 is a cross-section of the polycrystalline diamond table after reaction with the bromine gas and washing with the acetone. The bright areas of the micrograph indicate cobalt. This treatment removed a substantial amount of the cobalt to a depth of approximately 40-60 microns. This depth of penetration and removal of catalyst for a traditional acid cleaning may take an excess of 24 hrs to achieve, while the present example was achieved in a period of less than 4 hrs, which illustrates that the methods described herein provide for effective and efficient removal of the catalyzing material from polycrystalline diamond table.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   exposing a catalyzing material disposed in interstitial spaces of a polycrystalline diamond table to a halogen gas to produce a catalyst salt in the interstitial spaces of the polycrystalline diamond table, wherein exposing is at a temperature and a pressure sufficient to react the catalyzing material and the halogen gas but insufficient to cause the catalyst salt to incorporate into a gas phase.

2. The method of claim 1 further comprising:
   brazing the polycrystalline diamond table having the catalyst salt therein to a hard composite substrate.

3. The method of claim 1 further comprising:
   treating the polycrystalline diamond table having the catalyst salt therein with a polar organic solvent, thereby removing at least some of the catalyst salt from the interstitial spaces of a polycrystalline diamond table.

4. The method of claim 3 further comprising:
   brazing the polycrystalline diamond table having at least some of the catalyst salt removed to a hard composite substrate.

5. The method of claim 1, wherein the halogen gas is bromine, the catalyzing material is cobalt, the temperature is 20° C. to 100° C., and the pressure is 0.1 MPa to 4 MPa.

6. The method of claim 1, wherein the temperature is 0° C. to 300° C.

7. The method of claim 1, wherein the pressure is ambient pressure to 4 MPa.

8. The method of claim 1, wherein the catalyst salt comprises at least one of: cobalt fluoride, cobalt chloride, cobalt bromide, cobalt iodide, nickel fluoride, nickel chloride, nickel bromide, nickel iodide, iron fluoride, iron chloride, iron bromide, or iron iodide.

9. The method of claim 1 further comprising: diluting the halogen gas in an inert gas.

10. The method of claim 9, the halogen gas is present at 10% to 99% of a total gas phase by mole.

11. A method comprising:
    exposing a catalyzing material disposed in interstitial spaces of a polycrystalline diamond table to a halogen dissolved in a nonpolar organic solvent to produce a catalyst salt in the interstitial spaces of the polycrystalline diamond table, wherein the catalyst salt has a solubility of less than 0.1 g/100 mL in the nonpolar organic solvent.

12. The method of claim 11 further comprising:
    brazing the polycrystalline diamond table having the catalyst salt therein to a hard composite substrate.

13. The method of claim 11 further comprising:
    treating the polycrystalline diamond table having the catalyst salt therein with a polar organic solvent, thereby removing at least some of the catalyst salt from the interstitial spaces of the polycrystalline diamond table.

14. The method of claim 13 further comprising:
    brazing the polycrystalline diamond table having at least some of the catalyst salt removed to a hard composite substrate.

15. The method of claim 11, wherein exposing the catalyzing material to the halogen dissolved in the nonpolar organic solvent is at a temperature of 0° C. to 300° C.

16. The method of claim 11, wherein exposing the catalyzing material to the halogen dissolved in the nonpolar organic solvent is at a pressure of ambient pressure to 4 MPa.

17. The method of claim 11, wherein the catalyst salt comprises at least one of: cobalt fluoride, cobalt chloride, cobalt bromide, cobalt iodide, nickel fluoride, nickel chloride, nickel bromide, nickel iodide, iron fluoride, iron chloride, iron bromide, or iron iodide.

* * * * *